United States Patent [19]
Person et al.

[11] Patent Number: 6,044,371
[45] Date of Patent: Mar. 28, 2000

[54] METHOD FOR MODIFYING COMPUTER SYSTEM AND SYSTEM RESULTING THEREFROM

[75] Inventors: Garry Person, Hackensack, N.J.; Ilze Marovskis, Bronx, N.Y.

[73] Assignee: Merrill Lynch, Pierce, Fenner & Smith, New York, N.Y.

[21] Appl. No.: 08/960,900

[22] Filed: Oct. 30, 1997

[51] Int. Cl.⁷ .................................................. G06F 17/30
[52] U.S. Cl. .............................. 707/6; 707/10; 707/100; 707/101
[58] Field of Search ................... 707/100, 10, 6, 707/101

[56] References Cited

U.S. PATENT DOCUMENTS

| | | | |
|---|---|---|---|
| 5,630,118 | 5/1997 | Shaughnessy | 707/1 |
| 5,719,826 | 2/1998 | Lips | 368/29 |
| 5,758,346 | 5/1998 | Baird | 707/101 |
| 5,765,145 | 6/1998 | Masiello | 707/1 |
| 5,809,500 | 9/1998 | Nolan | 707/6 |
| 5,832,509 | 11/1998 | Mortis et al. | 707/200 |
| 5,878,422 | 3/1999 | Roth et al. | 707/100 |
| 5,897,633 | 4/1999 | Nolan | 707/6 |

*Primary Examiner*—Anton W. Fetting
*Assistant Examiner*—Jean M. Corrielus
*Attorney, Agent, or Firm*—Hopgood, Calimafde, Kalil & Judlowe LLP

[57] ABSTRACT

The invention provides a calendar interface system associated with a host computer for returning date-compliant data to an application running remotely from the host and requesting date data and a method for modifying such systems to be date compliant.

7 Claims, 3 Drawing Sheets

METHOD FOR MODIFYING COMPUTER SYSTEM AND SYSTEM RESULTING THEREFROM

BACKGROUND OF THE INVENTION

1. The Field of the Invention.

The present invention relates to computer systems that utilize date information, especially such systems that include a host computer supplying date information remotely to a local workstation requiring date information, and especially to methods for modifying existing systems and implementing the same.

2. The State of the Art.

Various applications (software) programs utilize date functions in a number of different ways. Date information is typically included as a data field in a database for record entry, such as tracking telephone calls, insurance claims, stock trading and/or settlement dates, order entry, and the like. Date information is also utilized for automated (macro) processing, such as paying bills from an accounting or personal finance application, as triggers for data backups and other transmissions or actions that are performed on a regular or periodic basis. Software applications can be programmed to treat date data as text (i.e., alphabetical, non-numeric) or as a numerical or formula-based value (i.e., numeric), and sometimes as both.

In the programming arts, date data is usually handled in a particular format predetermined by the programmer. Very often, this format is the typical month-day-year American format (and sometime optionally the European format of day-month-year). The date data is typically represented by numbers, and sometimes a three letter abbreviation for the month (e.g., "jun" for June and "jul" for July), with a unitary or set of defined data delimiters, such as hyphens and/or slashes, for separating the three data units defining typical date data (e.g., Jan. 1, 1990 or 1-jan-90 for Jan. 1st, 1990). Internally, software applications typically convert the input date data into a more usable, numerical form. Some date data also requires the use of the fractional date parts hours and minutes.

Because it would be an unusual calculation requiring a data entry, an output, or a calculation based on a date on the order of a century prior to the present, applications (or rather, their designers and programmers) often assume that the date entered or output refers to a date in the present "century," i.e., between 1900 and 1999. In either or both cases, an arbitrary date, such as Jan. 1st, 1900, is denoted as day number one (a base date) and all other dates are calculated as the number of days from the base date (analogous to a Julian calendar starting on a different arbitrary date); sometimes this sequential reference date is called a serial date or (incorrectly) a Julian date.

With the advent of cheaper, faster, and more reliable communications devices and media, various sizes of computers requiring date data can be connected to each other for controlled communications and interfacing. In a network system, in which one or more communications backbones allows for various computers to interface with each other, it may be desirable to have certain computers operate software applications locally and to have others operate software applications that, when operating, are shared among users. In both cases, passing date data among the various computers is often frustrated by the different predefined limitations on the form and range of the date data which is acceptable as input and/or output for each of the various applications. For example, distributed applications may be running on different platforms, or a shared application may be required to output data to workstations running on different platforms, exacerbating the communications and interface problem.

Still another problem, which has received some attention but little solution, is the often-inherent limitation in various software applications that a given date will range between 1900 and 1999 when, in commerce today, timetables and scheduling for events in the third millennium CE (2000 and beyond) are already required. Assumptions about the date range required for application operation and data was originally made to save memory allocation space, because a year assumed to be between 1900 and 1999 can be defined by a smaller value requiring less storage area (e.g., "85" for "1985"). Because of the inherent assumption in such applications as to the form and range of the date data, errors occur in processing. The solutions to such a problem include as least some rewriting of the software code, and especially modifying the stored data so that it accurately reflects the century. However, it has been estimated that the world-wide cost for upgrading all of the data and applications reliant thereon to accurately reflect changes in the numerical representation of the century will cost in the hundreds of billions of dollars. Various "solutions" to the year 2000 problem (often termed "Y2K problem") are described on internet world wide web sites (e.g., Bellcore, IEEE, Information Technology Assn. of America) and in various printed publications (e.g., "Year 2000 or Bust," *Chem. Eng.*, July 1997). These publications do not, however, provide a solution but rather a methodology towards a solution; namely, purchasing date-compliant software, and reprogramming and adequate testing the system to assure that it is date-compliant.

SUMMARY AND OBJECTS OF THE INVENTION

In view of the foregoing, one of the objects of this invention is to provide an improved system that generates date data for an application running at a workstation that requires such data in a particular or predefined form, and most preferably in a form that is unambiguous as to the century and is "date-compliant" (thus eliminating the year 2000 problem).

It is another object of this invention to provide date translations for applications that receive date data from other applications or sources having different date formats.

Yet another object of this invention is to provide addressable calendar databases having different data and accessible on the same system, such as calendars for different countries.

Still another object of this invention is to identify and/or locate in one or more of those addressable calendars particular dates denoting holidays, business holidays, bank holidays, settlement days (and settlement holidays), and other such particular date events as may be required by other applications in performing various date-related functions.

Still another object of this invention is to provide a method for modifying a computer system having applications running both remotely and locally at work stations so that the modified system is fully date compliant.

In one embodiment the invention provides a method for modifying a computer system comprising a plurality of workstations and a host computer with which the workstations are in communication, wherein the workstations run (i) independent applications generating date data locally and (ii) dependent applications generating date data through a call to the host to make said system date-compliant, which method comprises (A) reprogramming said independent applications (if any) generating date data locally to be date-compliant and (B) providing a calendar interface module in communication with said host computer, which module comprises (i) means for receiving a date data request from the dependent application, (ii) an associated accessible calendar database (CDB), (iii) means for operating on said date data with reference to the CDB to provide date-compliant date data, and (iv) means for sending the date-compliant date data to said dependent application requesting the same. In other independent embodiments, the output data is forced to be date-compliant and the input date is compared with a moving window of dates assumed to be in the current century.

DETAILED DESCRIPTION OF SPECIFIC EMBODIMENTS

Workstations typically run two types of programs: those that calculate the date data locally and those that call another system and request date data Those that calculate the date data locally are termed herein "Independent" applications; they read the system date from the workstation or from an external date card or otherwise are provided with a reference date input on which their calculations are based. Other types of applications make a call (e.g., call a subroutine locally or at a remote host computer), often passing parameters, requesting that specific date data be returned to the application; they are termed herein "dependent" applications because they depend on another application to provide the date data on which they operate and/or which they display.

To modify systems to be Y2K date-compliant, independent applications must be reprogrammed and tested to assure that they are internally consistent and perform the date calculations required in the proper manner. On the other hand, dependent applications may have to be reprogrammed (e.g., to operate on date data unambiguous with respect to the century) but must make calls to systems that necessarily return date-compliant date data. To assure that the return data is Y2K-compliant, the present invention provides a calendar interface system.

For each action performed by the present calendar interface system (CIS hereinafter), input date data for the local workstation must be received and validated. Raw or reference input date data is generally obtained (i) from an application program running on the host or a remote computer, (ii) from direct operator input, or (iii) from an external source, such as a data input or storage source (e.g., a data punch card, a static control card, a sequential data set, or paper or magnetic tape), or via an external system (e.g., a timing signal such as is carried on public broadcasting television, or a commercially available financial market or time-keeping database).

When implemented as software, the present CIS can be invoked from any desired programming language, such as and preferably selected from among COBOL, Assembler, PL/1, "C" (such as C++), Pascal, and other languages.

Preferably, when the CIS is called or invoked by a dependent applications software program running on a remote computer (i.e., the workstation remote from a host or mainframe with which the CIS is associated), a single copy of the calendar interface batch processor/driver will be loaded into the local memory associated with the workstation. The initial call and all subsequent calls to the calendar interface system will thereafter be invoked via the locally-loaded batch processor/driver. As an alternative to a batch processing mode, the CIS can be invoked by a direct call via the network to the CIS module.

Figure 1:
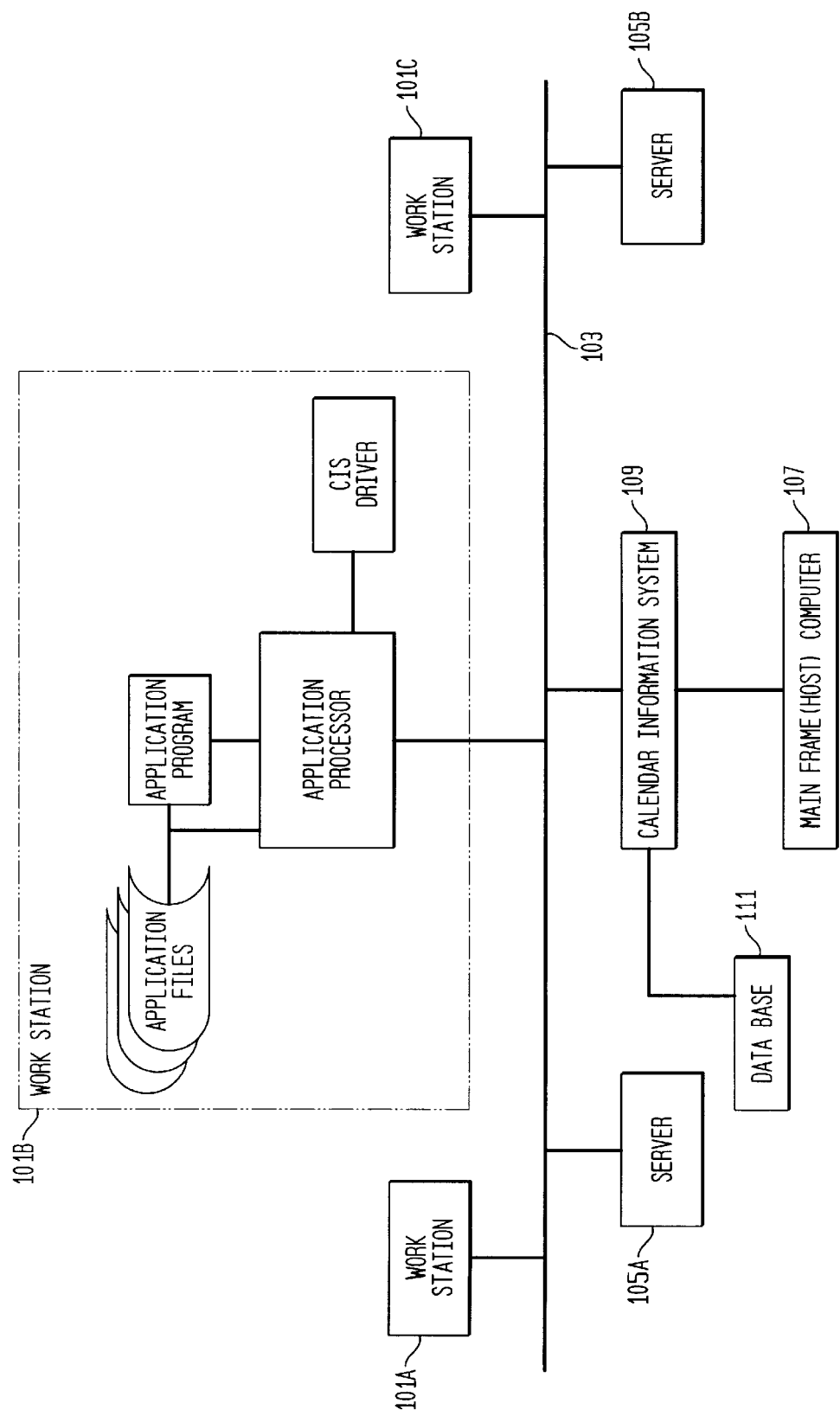
FIG. 1 depicts an idealized overview of a network system utilizing the present calendar interface system.

FIG. 1 depicts an embodiment of the present system as modified. A plurality of workstations 101A, 101B, 101C is connected to a date communications network 103 where communications are routed by servers 105A and 105B, (b)routers, and the like. The network allows the workstations to communicate with a host computer 107 and the CIS 109 can be virutally positioned before the host to intercept and operate on requests for date data; the fixed database(s) 111 used by the CIS are shown also. A typical workstation is shown in detail for 101B and includes an application processor 113 which is used by one or more application programs 115 storing some data locally in files 117. A CIS batch driver 119 is shown effectively loaded on to the system.

When the CIS is provided with operand data for an operation that is insufficient, incorrect, or otherwise results in an error condition, especially an unrecoverable error condition, the CIS preferably returns the calculated values (although perhaps erroneous) as well as an error code. Error conditions from which processing cannot be recovered can be caused by invalid input date data, invocation of a non-existent CIS function, a missing database resource, and the like. The parameters of the locally-loaded batch processor/driver can be modified so that invocation of the CIS, and local processing of the application, is/are not terminated if an error condition is present. Preferably, the parameters are set so that if the CIS encounters an unrecoverable error, the data returned include, appended or imbedded therein, a code related to the reason for the unrecoverable error (e.g., specifying the specific cause of the error). For example, if the external data source provides what is supposed to be Julian date data but a non-numeric character is read, an unrecoverable error is encountered (no date can be calculated). If the error code for this type of error is assigned a value of 303, and a reason code (e.g., encountering non-numeric character in Julian date data) of 03 is assigned, the value passed to the remote computer can be in the form of 30303, the reason code being appended to the error code. The parameters can also be set either to allow local application processing to continue, or to suspend processing if the CIS returns any of the error codes or only one or a particular set of error codes.

When the CIS is invoked from a computer in batch mode processing, additional storage is allocated in order to store data tables, parameters, resident routines, and other information required for invoking the CIS. From a practical point of view, actually storage space is limited to the hardware (and capitalization) available at the computer, and so has a finite size. Although multiple use storage areas are feasible for certain applications, for storing interim data related to an application running on a remote computer it would not be cost effective to store such data elsewhere on the network because the resulting increase in network traffic (and decrease in transmission times and available bandwith) likely does not justify remote storage. Thus, it is preferrable if the computer remote from the host has the ability (or can be programmed with the ability) to terminate the locally-loaded CIS program and free the memory allocated thereto for other applications after calls to the CIS have been completed.

In a direct processing mode, all of the information required from the CIS is passed via the network and returned to the workstation for integration into the dependent application that called for the CIS. As such, virtually no additional storage needs to be allocated.

All data required for the CIS to operate upon and that is returned to the application invoking the CIS is stored in a calendar request block ("CRB" hereinafter). The CRB can be visualized as a data table including data items, each of which has a specified length (or variable lengths can be used if specific data delimiters are used and interpreted from the data stream). Some of the data items are dedicated to output, some to input, and some can be either output or input, depending upon the data passed and the operation(s) sought from the CIS. An example of possible and preferred data items present in a CRB are shown in Table 1. There can be a number of different CRBs, such as a short version having only certain data items, and a long version including all of the data items. A short version of the CRB can be utilized by making assumptions regarding the date data items not passed to the CIS. For example, if the current date is not specified, the CIS can be programmed to assume that receipt of the short version of the CRB requires the CIS to assume that the current date is the current system date. The CRB is a workspace for calculating date data that is common between the dependent application at the workstation and the CIS.

The CIS preferably also has the capability to provide for specific input date data formats and mask codes. These date formats (as described in the Background section above) can be specified for the input data, the output data, or both.

TABLE 1

| Data Item | Data Length | Description | Field Type |
| --- | --- | --- | --- |
| CRB-RC | full word (binary) | Return Code (RC) - code signifying whether operation requested was successful, and if not, then containing an error code | Input |
| CRB-OPT | half word (binary) | Option (OPT) - the option number corresponds to a predetermined requested operation from the CIS | Input |
| CRB-COUNT | half word (binary) | As Input - specifies magnitude and direction of scroll request relative to pointer position in CIS database As Output - returns from CIS number of event occurences counted (or other specified data) | Input or Output |
| CRB-EVENT | A/N Len(12) | Specifies Event symbol that identifies the particular calendar to be used when an event-oriented request is invoked of the CIS | Input |
| CRB-INDATE1 | A/N Len(10) | As Input - a date-from-program, or a date translation request from the CIS, in date input format As Output - whenever a date validation is requested form the CIS, returns a date in full Gregorian format (YYYYMMDD) | Input or Output |
| CRB-INDATE2 | A/N Len(10) | Specifies the other limit of the date when a range of dates is specified for an event-related request. | Input |
| CRB-FORMAT | A/N Len(3) | Specifies the format (mask) of the date data sent to and returned from the CIS; if not specified, YYYYMMDD can be specified as default | Input and Output |
| CRB-VALUE | A/N Len(12) | Resultant date data from a query command | Output |
| CRB-CLENDAR-DATA | (Group-Item) | | N/A??? |
| CRB-WEEKDAY | Z/D Len(1) | The day of the week of the date returned from the CIS is encoded as a digit (e.g., Sunday = 1, Saturday = 7) | Output |
| CRB-WEEK-YEAR | Z/D Len(2) | The numerical value of the week with respect to the approx. 53 weeks in a year, returned as value from 1 to 53. | Output |
| CRB-WEEK-MONTH | Z/D Len(1) | The numerical value of the week with respect to the number of weeks in a given month, returned as a value ranging from 1 to 5. | Output |
| CRB-BUSINESS | Z/D Len(3) | The number of the Business day in the calendar year that corresponds to the date being validated; returns zero(es) if the date being validated is not a business day; depending upon the calendar used by the CIS. | Output |
| CRB-DAYS-LEFT | Z/D Len(3) | The number of calendar days occurring between the date validated (excluding the validated date) until the last day of the year; ranges from 000 to 364 (and to 365 for leap years). | Output |

Once a CRB is defined and the CIS is invoked by passing the CRB along with operands and control data to the CIS, the CIS performs the operations on the operands with reference to a separately addressable calendar database ("CDB" hereinafter). The CDB is preferably a read-only storage area, that is maintained and updated separately from the CIS. The CDB contains databases of calendars, including data indicating special holidays, business days, other important days, and the like, as generally associated with a calendar. The CDB may contain separate database calendars for the USA, for Europe, for Japan, and for other areas or markets. Each of these calendar databases may include different information, such as legal and financial holidays in each locale, which days of the week are business days, and the like. Further, each CDB calendar can have coded therein information about other one-time, occasional, and/or periodic occurrences. For example, "events" can be added to define one or a set of days as corresponding to a particular event (e.g., quarterly earnings for a particular industry typically being reported on such days or dates). An "event" can be considered as a real occurrence having logical annotations distributed throughout the CDB. One or more types or catagories of events can be included, and a heirarchy can be defined for the events. Such a heirarchy preferably allows a type of event heirarchically higher to be modelled on one or more heirarchically lower event definitions. Further, a group of related events can be defined with respect to previously defined specific events. Analogously, aliases can be used as a sort of indirect addressing for a particular business calendar, event, or event group.

The CIS performs the function required by the dependent application by querying the CDB. A preferred set of query commands is listed in Table 2. The query commands are based on the position and control of a virtual pointer in the CDB.

TABLE 2

| FUNCTION NAME | FUNCTION DESCRIPTION/RESULT |
| --- | --- |
| CHECK BUSINESS | is the pointer pointed to a business day |
| CHECK SETTLEMENT | is the pointer pointed to a Settlement Day, or is there one or more Settlement Days in the days within a pointer range |
| CHECK HOLIDAY | is the pointer pointed to a corporate business holiday, or is there one or more corporate business holidays in the days within a pointer range |
| CHECK BANK HOLIDAY | is the pointer pointed to a bank holiday, or is there one or more bank holidays in the days within a pointer range |
| CHECK LOCAL HOLIDAY | is the pointer pointed to a local holiday, or are one or more local holidays in the days within a pointer range |
| EVENT CHECK | check for the occurrence of a specific event at the pointer |
| EVENT COUNT | count the number of occurrences of a specific event over a range of dates |
| EVENT SCROLL | scroll the calendar over a specific number of occurrences of a specific event. |
| COUNT CALENDAR DAYS | count the number of actual calendar days occurring within a specific range of dates |
| COUNT BUSINESS DAYS | count the number of business days occurring within a specific range of dates |
| COUNT SETTLEMENT DAYS | count the number of settlement days occurring within a specific range of dates |
| COUNT EVENT FOR YEAR | count the number of specific event occurrences during a particular year |
| COUNT EVENT FOR QUARTER | count the number of specific event occurrences during a specific quarter (three consecutive months) of particular year |
| COUNT EVENT FOR MONTH | count the number of specific event occurrences during a particular month |
| SCROLL YEARS | scroll the calendar a specific number of yearly increments |
| SCROLL MONTHS | scroll the calendar a specific number of monthly increments |
| SCROLL WEEKS | scroll the calendar a specific number of weekly increments |
| SCROLL DAYS | scroll the calendar a specific number of days |
| SCROLL BUSINESS DAYS | scroll the calendar a specific number of business days |
| SCROLL SETTLEMENT DAYS | scroll the calendar a specific number of settlement days |
| SCROLL BUSINESS HOLIDAYS | scroll the calendar a specific number of business holidays |
| POINT TO START OF YEAR | position the pointer at the start of the year currently referenced |
| POINT TO START OF MONTH | position the pointer at the start of the month currently referenced |
| POINT TO END OF MONTH | position the pointer at the end of the month currently referenced |
| POINT TO START OF WEEK | position the pointer at the first day of the week currently referenced |
| POINT TO END OF WEEK | position the pointer at the last day of the week currently referenced |
| POINT TO START OF QUARTER | position the pointer at the first day of the quarter currently referenced |
| POINT TO END OF QUARTER | position the pointer at the last day of the quarter currently referenced |
| POINT TO CURRENT DATE | position the pointer at the current system date |
| POINT TO CURRENT BUSINESS DAY | position the pointer at the current business day |

To implement the various calendaring functions, such as those shown in Table 2, the CIS preferably has a front end that includes a driver, interpreter, or other preprocessor or translator to allow a user or a dependent application program to invoke one or more of the CIS functions with call commands that appear like those in commonly used programming languages (from COBOL and C++, as mentioned above, to "macro" languages as might be part of an application program). Imagining, for example, a calendar as an infinite scroll of monthly wall calendars, these call commands are generally related (a) to pointing at a particular date or a particular reference date or a range of dates and (b) to moving to, or with respect to, a particular date or a particular reference date or range of dates. Examples of particular reference dates include: the first or last day of a month or year; the first or last business day of a week, month, or year; holidays; predefined important days (e.g., April 15 (tax payment day), days when government reports are released, days when government paper is sold, etc.); a customer's effective end of month date for purposes of interest or distribution payments; and other events as might be desired. Examples of invoking the calendaring functions are shown below.

In "request mode," the dependent application uses the common CRB area to preform the necessary date calculation. A sample calculation is:

MOVE +32 to CRB-OPT
MOVE 'customer' to CRB-EVENT
MOVE +2 to CRB-COUNT
MOVE 'M01' to CRB-FORMAT
CALL 'CIS' using CALENDAR-REQUEST-BLOCK
  END-CALL
MOVE CRB-VALUE to MY-OUTDATE In this example, the CRB-OPT is a listed option of various CIS functions, here to scroll a defined number of events (EVENT SCROLL in Table 2) and here the particular event is (arbitrarily) the customer's end of month date; the number of events to be scrolled through is two in the forward direction; and the date data is to be returned in a format defined by mask M01. After this information is passed to the CRB, the CIS is called to operate on the data pursuant to the parameters, and the result is stored in a CRB block called value; the result is then moved into the local workspace (MY-OUTDATE) to be used by the dependent application.

The CIS can also be invoked in a "command mode" in which parameters are passed to the CIS rather than stored in a common workspace. The same sample calculation could be written as follows:

```
01    MY-OUTDATE     PIC X(10)
01    PARAMETERS
  02  ESCROLL        PIC X(08)      VALUE 'ESCROLL'
  02  CUSTOMER       PIC X(12)      VALUE 'CUSTOMER'
  02  M01            PIC X(03)      VALUE 'M01'
  02  FW02           PIC X S9(08)   VALUE +2
...
CALL 'CIS' USING ESCROLL CUSTOMER FW02 MY-OUTDATE
M01 END-CALL
```

The "ESCROLL" parameter is a shorthand for the "EVENT SCROLL" function listed in Table 2. The command mode call syntax shown lists serially the application (CIS), the operands (customer, direction of scrolling (forward by 2)), the variable name in which the CIS should store the result (MY-OUTDATE), and the date format mask (M01). It is preferred in this "command mode" that any intermediate calculation date be stored locally at the CIS and unavailable to the dependent application calling the CIS. The invention can also be implemented in a "function mode" identical to the command mode except that intermediate values and data are stored locally at the workstation.

Figure 2:
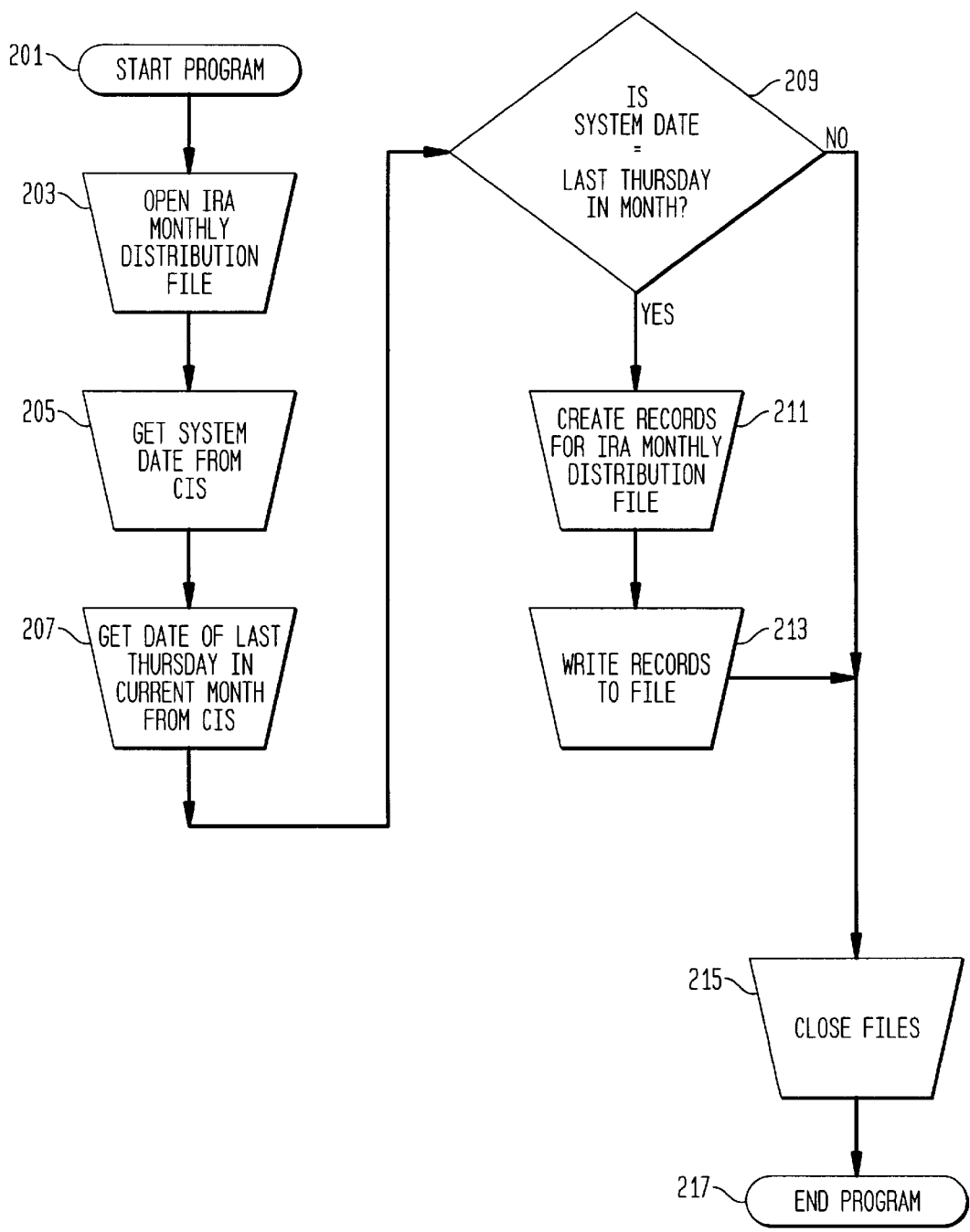
FIGS. 2 and 3 depict flowcharts of application processing that invokes the present calendar interface system.
Figure 3:
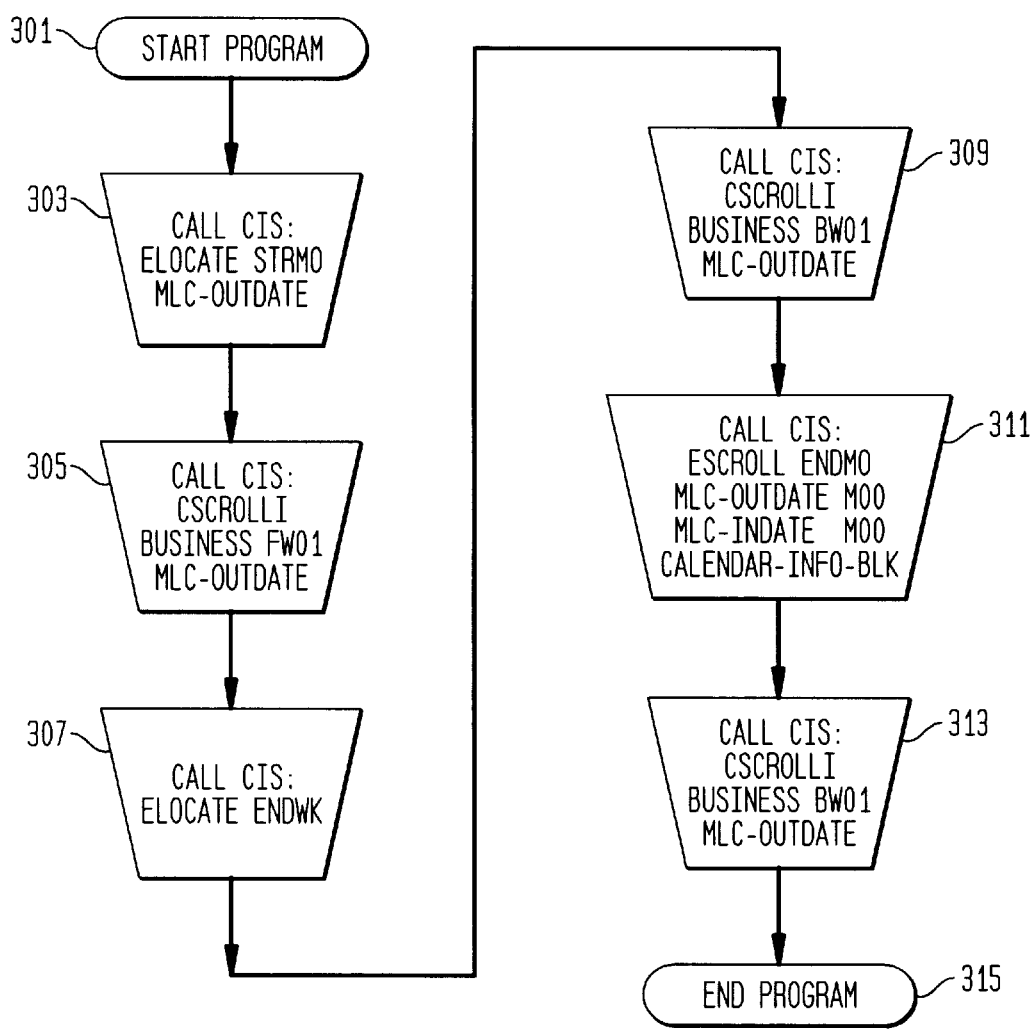

As an example of the sequence of operations occuring at an application program invoking the CIS for a particular financial operation is shown in FIG. 2. This example is for the operation of creating reports on the fourth Thursday of each month of monthly IRA (individual retirement account) distributions. The program (or subroutine) starts 201 and opens a stored data file 203 containing records of monthly IRA distributions. A call is made to the CIS to return the system date 205 (such as with the SYSDATE command in Table 3), and then to return the fourth Thursday in the current month 207. The system (current) date and the date of the fourth Thursday are compared 209. If the system date is the fourth Thursday, then another program is invoked 211 to create the records for the IRA monthly distribution, and those records are written to a file 213, and the files are closed 215 and the program terminates 217. If the system date is not the fourth Thursday, the files are closed 215 and the program terminates 217. Another example of the CIS working in combination an application program is returning the first and last business days in a given month. FIG. 3 depicts a flow chart for returning the first and last business days of the current month. The program starts 301 and a call 303 is made to the CIS ("CORPCAL") using the commands shown in Table 3 to locate the starting day of the month (ELOCATE STRMO, the command to locate the start date of the actual month). The pointer from the last call being at the first day of the month, another call 305 is made to scroll forward to the first business day of the month (CSCROLLI BUSINESS FW01), which is returned to the application program. With the pointer now residing on the first business day of the month, the pointer is scrolled 307 to the last actual day of the week of the first business day of the month, and then scrolled backwards 309 to the last business day of that week. From there the pointer is scrolled weekly 311 to the last actual day of the month and then scrolled backwards 313 to the last business day of the month, which is returned to the application program. The program then terminates 315, with the first and last business days of the month having been sent to the requesting application program.

To assure Y2K compliant date data is returned to dependent applications, it is preferred that the CIS accept both compliant and non-compliant data as input and that the output be forced into a date-compliant mask, otherwise an error code will be returned to the calling application. Still further, the present method can facilitate accepting non-compliant input data by using a 'moving window' of dates assumed to be compliant. For example, the present year is 1997. The CIS is programmed to assume that any two digit representation of the year date as input from "80" to "19" is a date ranging from 1980 to 2019, and that any other two digit representation of the input year date, namely "20" to "79", is part of the twenty-first century from 2020 to 2079. Accordingly, this scheme provides a twenty year window in which certain two digit year date input is assumed to reside in this century and otherwise in the next century. When the next year (1998) arrives, the CIS will read the change in the year in the system date and automatically shift the window up, so that two digit year dates between "81" and "20" will be assumed to range from 1981 to 2020 and otherwise from 2021 to 2080.

Because the CIS utilizes a CDB and performs intermediate calculations, it is also possible for the CIS to process a request to provide a multicomponent output file for later use by an application. Such a "date record file" can include serially arranged data, for example: the key date for the current record stored as a Gregorian date (8 bytes); the key date in Lilian format (8 bytes); the key date in Julian format (8 bytes); the day of the week of the key date (1 to 7; 1 byte); the number of week of the year in which the key date falls (1 to 52; 2 bytes); the week of the month in which the key date falls (1 to 5; 1 byte); the days remaining in the year subsequent to the key date (1 to 365; 2 bytes); the numeric business day of the year of the key date (1 to 260; 2 bytes); the number of calendar days after a previous event (e.g., customer's end of month for interest calculations, 1 to 31; 2 bytes); and so on (or empty space).

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A method for modifying a computer system comprising a plurality of workstations and a host computer with which the workstations are in communication, wherein the workstations run (i) independent applications generating date data locally and (ii) dependent applications generating date data through a call to the host to make said system date-compliant, which method comprises:

A. reprogramming said independent applications generating date data locally to be date-compliant; and
   B. providing a calendar interface module in communication with said host computer, which module comprises
      a. means for receiving a date data request from the dependent application,
      b. an associated accessable calendar database (CDB),
      c. means for operating on said date data with reference to the CDB to provide date-compliant date data, and
      d. means for sending the date-compliant date data to said dependent application requesting the same.

2. The method of claim 1, wherein said CDB comprises data generally occurring on a regular or periodic dates.

3. The method of claim 2, wherein said periodic data is selected from the group consisting of holidays, business days, settlement days, business holidays, bank holidays, and the like, and combinations thereof.

4. The method of claim 1, wherein date data request from the dependent application includes a two digit year date representation and the CIS defines the representation, prior to operating thereon in step c., as falling in a particular century if the representation is in a predetermined window and otherwise as falling in a different century.

5. The method of claim 4, wherein the CIS adjusts the window as the actual year date advances to the next year.

6. The method of claim 1, wherein said date data request is made in request mode.

7. The method of claim 1, wherein said date data request is made in command mode.

* * * * *